United States Patent
Wang

(10) Patent No.: US 11,919,778 B2
(45) Date of Patent: Mar. 5, 2024

(54) METHOD AND SYSTEM FOR RECYCLING CARBON DIOXIDE

(71) Applicant: YUANCHU TECHNOLOGY (BEIJING) CO., LTD., Beijing (CN)

(72) Inventor: Qi Wang, Beijing (CN)

(73) Assignee: YUANCHU TECHNOLOGY (BEIJING) CO., LTD., Beijing (CN)

( * ) Notice: Subject to any disclaimer, the term of this patent is extended or adjusted under 35 U.S.C. 154(b) by 136 days.

(21) Appl. No.: 16/762,235

(22) PCT Filed: Oct. 16, 2018

(86) PCT No.: PCT/CN2018/110352
§ 371 (c)(1),
(2) Date: May 7, 2020

(87) PCT Pub. No.: WO2019/091259
PCT Pub. Date: May 16, 2019

(65) Prior Publication Data
US 2020/0361781 A1    Nov. 19, 2020

(30) Foreign Application Priority Data
Nov. 7, 2017    (CN) .......................... 201711085755.6

(51) Int. Cl.
*C01F 11/18* (2006.01)
*B01D 53/62* (2006.01)
(Continued)

(52) U.S. Cl.
CPC ............ *C01F 11/181* (2013.01); *B01D 53/62* (2013.01); *C01B 32/60* (2017.08); *C01B 33/12* (2013.01); *C01F 5/24* (2013.01)

(58) Field of Classification Search
CPC .......... C01F 11/181; C01F 5/24; C01B 32/60; C01B 33/12; B01D 53/62
(Continued)

(56) References Cited

U.S. PATENT DOCUMENTS

| 6,159,442 A | 12/2000 | Thumm et al. |
|---|---|---|
| 6,221,332 B1 | 4/2001 | Thumm et al. |

(Continued)

FOREIGN PATENT DOCUMENTS

| CN | 101823695 A | 9/2010 |
|---|---|---|
| CN | 101823745 A | 9/2010 |

(Continued)

OTHER PUBLICATIONS

JP-2005097072-A English translation (Year: 2005).*
(Continued)

*Primary Examiner* — Anita Nassiri-Motlagh
(74) *Attorney, Agent, or Firm* — Westman, Champlin & Koehler, P.A.

(57) ABSTRACT

Disclosed are a method and a system for recycling carbon dioxide. The method includes chlorinating a calcium-containing silicate and/or a magnesium-containing silicate to obtain a calcium chloride and/or magnesium chloride, mixing the calcium chloride and/or magnesium chloride with ammonia water and carbon dioxide and performing a carbonation reaction to recover the carbon dioxide and convert it into calcium carbonate and/or magnesium carbonate while generating an ammonium chloride solution, and recovering the ammonium chloride solution generated in the carbonation reaction. The ammonium chloride solution after being concentrated or hydrogen chloride generated from a decomposition reaction of the ammonium chloride solution is directly used to chlorinate the calcium-containing silicate and/or the magnesium-containing silicate. The ammonium (Continued)

chloride is used as a catalyst for the entire mineralization of the carbon dioxide, the final product is the calcium carbonate and/or the magnesium carbonate.

18 Claims, 4 Drawing Sheets

(51) Int. Cl.
*C01B 32/60* (2017.01)
*C01B 33/12* (2006.01)
*C01F 5/24* (2006.01)

(58) Field of Classification Search
USPC .......................................................... 423/429
See application file for complete search history.

(56) References Cited

U.S. PATENT DOCUMENTS

| | | | |
|---|---|---|---|
| 9,051,189 | B2 | 6/2015 | Kim et al. |
| 2009/0220405 | A1 | 9/2009 | Lackner et al. |
| 2011/0038774 | A1 | 2/2011 | Zhong |
| 2013/0078168 | A1 | 3/2013 | Kim et al. |
| 2013/0202516 | A1 | 8/2013 | Jones et al. |
| 2013/0287673 | A1* | 10/2013 | Wang ........................ C01F 5/24 423/431 |
| 2014/0093441 | A1* | 4/2014 | Jones ........................ C01F 5/24 423/230 |
| 2014/0356267 | A1* | 12/2014 | Hunwick ............... B01D 53/80 423/220 |
| 2015/0232344 | A1 | 8/2015 | Kim et al. |

FOREIGN PATENT DOCUMENTS

| | | | |
|---|---|---|---|
| CN | 102114383 | A | 7/2011 |
| CN | 103030166 | A | 4/2013 |
| CN | 103230735 | A | 8/2013 |
| CN | 103974757 | A | 8/2014 |
| CN | 104284707 | A | 1/2015 |
| CN | 106517621 | A | 3/2017 |
| CN | 107720800 | A | 2/2018 |
| JP | 2005097072 | A * | 4/2005 |
| WO | 9907466 | A1 | 2/1999 |
| WO | 2013/022896 | A1 | 2/2013 |

OTHER PUBLICATIONS

International Search Report and Written Opinion, for International Application No. PCTCN2018/110352, dated Jan. 29, 2019, 17 pages.

First Office Action, including search, for Chinese Patent Application No. 201711085755.6, dated Apr. 15, 2023, 26 pages.

* cited by examiner

METHOD AND SYSTEM FOR RECYCLING CARBON DIOXIDE

CROSS-REFERENCE TO RELATED APPLICATIONS

This application is a Section 371 National Stage Application No. PCT/CN2018/110352, filed on Oct. 16, 2018, entitled "METHOD AND SYSTEM FOR RECYCLING CARBON DIOXIDE", which published as WO 2019091259 A1, on May 16, 2019, and claims priority to Chinese Patent Application No. 201711085755.6, filed on Nov. 7, 2017, the contents of which are incorporated herein by reference in their entireties.

FIELD OF THE DISCLOSURE

The present disclosure relates to a field of chemical and environmental protection, in particular, to a method and a system for recycling carbon dioxide.

BACKGROUND OF THE DISCLOSURE

Recovering and recycling carbon dioxide to reduce greenhouse gas emissions is an important technical issue in fields of climate change, environment and ecology. Currently, collection and disposal of carbon dioxide mainly includes geological storage, marine storage, mineralized storage, and biological carbon fixation, etc. The mineral carbonation fixation for carbon dioxide refers to a series of processes, in which the carbon dioxide reacts with ores containing alkaline or alkaline earth metal oxides (mainly calcium-magnesium silicate ores and industrial and building material wastes) to form carbonates and thus be stored. Mineralized storage is a method of absorbing carbon dioxide in nature, in which the generated carbonate is a thermodynamically stable form of carbon and has no impact on the environment. Therefore, carbonation fixation is the most stable and safe way to fix carbon. Thus, carbon fixation by mineral carbonation is the best choice for collection and disposal technology for carbon dioxide. However, technology for carbon fixation by mineral carbonation has not been applied in industries, and existing technical solutions have problems such as slow reaction rate, high energy consumption, high cost, poor technical economy, etc.

Currently, carbonation fixation process and technology for carbon dioxide that has been reported includes direct-dry gas-solid carbonation and liquid phase absorption carbonation. The direct-dry gas-solid carbonation employs a route in which carbon dioxide is directly subjected to gas-solid reaction with ores to generate carbonate. This reaction route has slow reaction rate and low efficiency, and even if the reaction rate is increased by pressurizing, requirements of large-scale industrial absorption may not be met. Therefore, the liquid phase absorption carbonation has become a main solution for carbon fixation by carbonation.

Methods for achieving liquid phase absorption carbonation can be further divided into a direct absorption method and an indirect absorption method. The direct absorption method is to grind ore, such as calcium magnesium silicate, into fine particles for reacting with carbon dioxide in the liquid phase to form carbonate. Its essential reaction is not different from the direct-dry gas-solid carbonation, except that the reaction rate is greatly improved when the carbon dioxide further reacts with fine ore particles due to the dissolving of carbon dioxide into carbonic acid in the liquid phase. Cost for grinding ores is very high, and the reaction rate still cannot meet the requirements of large-scale absorption. Therefore, this method is still not the best choice in terms of economics and efficiency. The indirect liquid phase absorption method converts the ore to an alkaline solution or suspension (hereinafter referred to as an alkaline solution), and absorbs carbon dioxide in the alkaline solution to form a carbonate, and further separates the carbonate to store the carbon dioxide. Two core aspects of the method are the conversion of ores and the absorption of carbon dioxide. Depending on the chosen minerals and the routes for conversion to obtain alkaline solutions, different process routes can be obtained. And depending on the system of the absorption reaction (solution, suspension or emulsion), there are different technical solutions for the absorption reaction.

Since sodium salt is widely available and inexpensive, and sodium hydroxide has a high solubility in water, the process in which the sodium salt is used as an absorption mineral is first proposed and industrialized. A typical process generally obtains sodium hydroxide by electrolysis of sodium salts (such as sodium sulfate), and absorbs carbon dioxide with the sodium hydroxide to obtain sodium bicarbonate or sodium carbonate. However, this technology is economically uncompetitive due to the use of high energy consumption during the electrolysis process for obtaining sodium hydroxide. Since sodium hydroxide has a high solubility in water, the absorption process is a neutralization reaction in solution, causing a fast reaction rate and making the design of the reactor relatively simple.

An existing direct liquid phase absorption method is described in CN104284707A, in which an indirect route uses calcium silicate, uses hydrogen chloride as the medium, and uses magnesium salt as hydroxide carrier. This technical route mainly has the following technical drawbacks: in order to realize the recycling of magnesium chloride, the technology has to heat the magnesium chloride to a high temperature (450° C. or above) to generate magnesium oxide or basic magnesium chloride, which makes the energy consumption of the entire process relatively high.

SUMMARY

In view of this, an object of the present disclosure is to provide a method and a system for recycling carbon dioxide with a higher reaction rate, a lower energy consumption and a lower cost.

According to an aspect of the present disclosure, a method for recycling carbon dioxide is provided, and comprises: chlorinating a calcium-containing silicate and/or a magnesium-containing silicate to obtain a calcium chloride and/or magnesium chloride; performing a carbonation reaction by mixing the calcium chloride and/or magnesium chloride with ammonia water and carbon dioxide, to convert the carbon dioxide into calcium carbonate and/or magnesium carbonate and generate an ammonium chloride solution, recovering the ammonium chloride solution generated in the carbonation reaction, wherein the ammonium chloride solution after being concentrated or hydrogen chloride generated from a decomposition reaction of the ammonium chloride solution is directly used to chlorinate the calcium-containing silicate and/or the magnesium-containing silicate.

Preferably, silicon dioxide is also generated in the step of chlorinating, and before the carbonation reaction, the method further comprises: separating out and discharging the silicon dioxide.

Preferably, after the carbonation reaction, the method further comprises: separating out and discharging the calcium carbonate and/or the magnesium carbonate.

Preferably, the step of chlorinating comprises: reacting the calcium-containing silicate and/or the magnesium-containing silicate with ammonium chloride, and the step of chlorinating further generates ammonia gas.

Preferably, the ammonia gas generated in the step of chlorinating is used to form the ammonia water which is used in the carbonation reaction.

Preferably, the step of recovering comprises: recovering the ammonium chloride solution generated in the carbonation reaction, and removing partial water of the recovered ammonium chloride solution to obtain the concentrated ammonium chloride solution, wherein the concentrated ammonium chloride solution is used for chlorinating the calcium-containing silicate and/or the magnesium-containing silicate.

Preferably, the step of removing partial water of the recovered ammonium chloride solution comprises: evaporating the ammonium chloride solution generated in the carbonation reaction, to obtain water vapor and the concentrated ammonium chloride solution, wherein the concentrated ammonium chloride solution is used for chlorinating.

Preferably, the water vapor obtained in the step of evaporating is subjected to heat recovery.

Preferably, the step of chlorinating comprises: reacting the calcium-containing silicate and/or the magnesium-containing silicate with hydrogen chloride.

Preferably, the step of recovering comprises: recovering the ammonium chloride solution generated in the carbonation reaction, performing a decomposition reaction of the recovered ammonium chloride solution to obtain ammonia gas and hydrogen chloride, wherein the hydrogen chloride obtained by the decomposition reaction is used for chlorinating.

Preferably, the ammonia gas obtained by the decomposition reaction is used to form the ammonia water which is used in the carbonation reaction.

According to another aspect of the present disclosure, a system for recycling carbon dioxide is provided, and comprises: a chlorinating reactor, configured to chlorinate a calcium-containing silicate and/or a magnesium-containing silicate to obtain calcium chloride and/or magnesium chloride; a carbonation reactor, connected to the chlorinating reactor, configured to mix the calcium chloride and/or magnesium chloride with ammonia water and carbon dioxide and perform a carbonation reaction to convert the carbon dioxide into calcium carbonate and/or a magnesium carbonate while generating an ammonium chloride solution; and a recovering device, connected between the carbonation reactor and the chlorinating reactor, configured to recover the ammonium chloride solution generated by the carbonation reactor, wherein the ammonium chloride solution after being concentrated or hydrogen chloride generated from a decomposition reaction of the ammonium chloride solution is directly fed from the recovering device into the chlorinating reactor.

Preferably, silicon dioxide is also generated in the chlorinating reactor, and the system further comprises: a first separator, connected between the chlorinating reactor and the carbonation reactor, configured to separate and then discharge the carbon dioxide.

Preferably, the calcium carbonate and/or the magnesium carbonate are discharged after being separated by sedimentation in the carbonation reactor.

Preferably, the system further comprises: a second separator, connected between the carbonation reactor and the recovering device, configured to separate and then discharge the calcium carbonate and/or the magnesium carbonate.

Preferably, in the chlorinating reactor, the calcium-containing silicate and/or the magnesium-containing silicate are reacted with ammonium chloride, and ammonia gas is further generated in the chlorinating reactor.

Preferably, an ammonia gas pipeline is further provided between the chlorinating reactor and the carbonation reactor, and is configured to feed the ammonia gas generated by the chlorinating reactor to the carbonation reactor.

Preferably, the recovering device is an evaporative concentrator that separates the recovered ammonium chloride solution into water vapor and the concentrated ammonium chloride solution, wherein the concentrated ammonium chloride solution is fed to the chlorinating reactor.

Preferably, the evaporative concentrator is further connected to the first separator through a heat exchanger.

Preferably, in the chlorinating reactor, the calcium-containing silicate and/or the magnesium-containing silicate are reacted with ammonium chloride.

Preferably, the recovering device is an ammonia gas regeneration reactor that configured to decompose the recovered ammonium chloride solution into ammonia gas and hydrogen chloride, wherein the hydrogen chloride obtained by decomposition is fed to the chlorinating reactor.

Preferably, the ammonia gas regeneration reactor is further connected to the carbonation reactor through a gas pipeline for feeding the ammonia gas obtained by the decomposition to the carbonation reactor.

Preferably, the chlorinating reactor is any one of a stirred vessel and a rotary furnace.

Preferably, the carbonation reactor is any of a bubble column, an airlift loop reactor, and a fluidized bed.

According to the method and system for recycling carbon dioxide of the disclosure, ammonium chloride is used as a catalyst for the entire mineralization of carbon dioxide, and the recycling of the ammonium chloride is realized, the entire process reducing the material consumption as compared with the prior art.

In the disclosure, recycling of the catalyst, which is ammonium chloride, may be achieved under low and medium temperature conditions, which does not require the catalyst to be heated to a high temperature for recovery, and hence significantly reduces the energy consumption of the process, as compared with the prior art such as a technical solution in which magnesium chloride is used as a catalyst.

BRIEF DESCRIPTION OF THE DRAWINGS

The above and other objects, features and advantages of the present invention will become more apparent from the description below with reference to the accompanying drawings.

DESCRIPTION OF THE EMBODIMENTS

Figure 1:
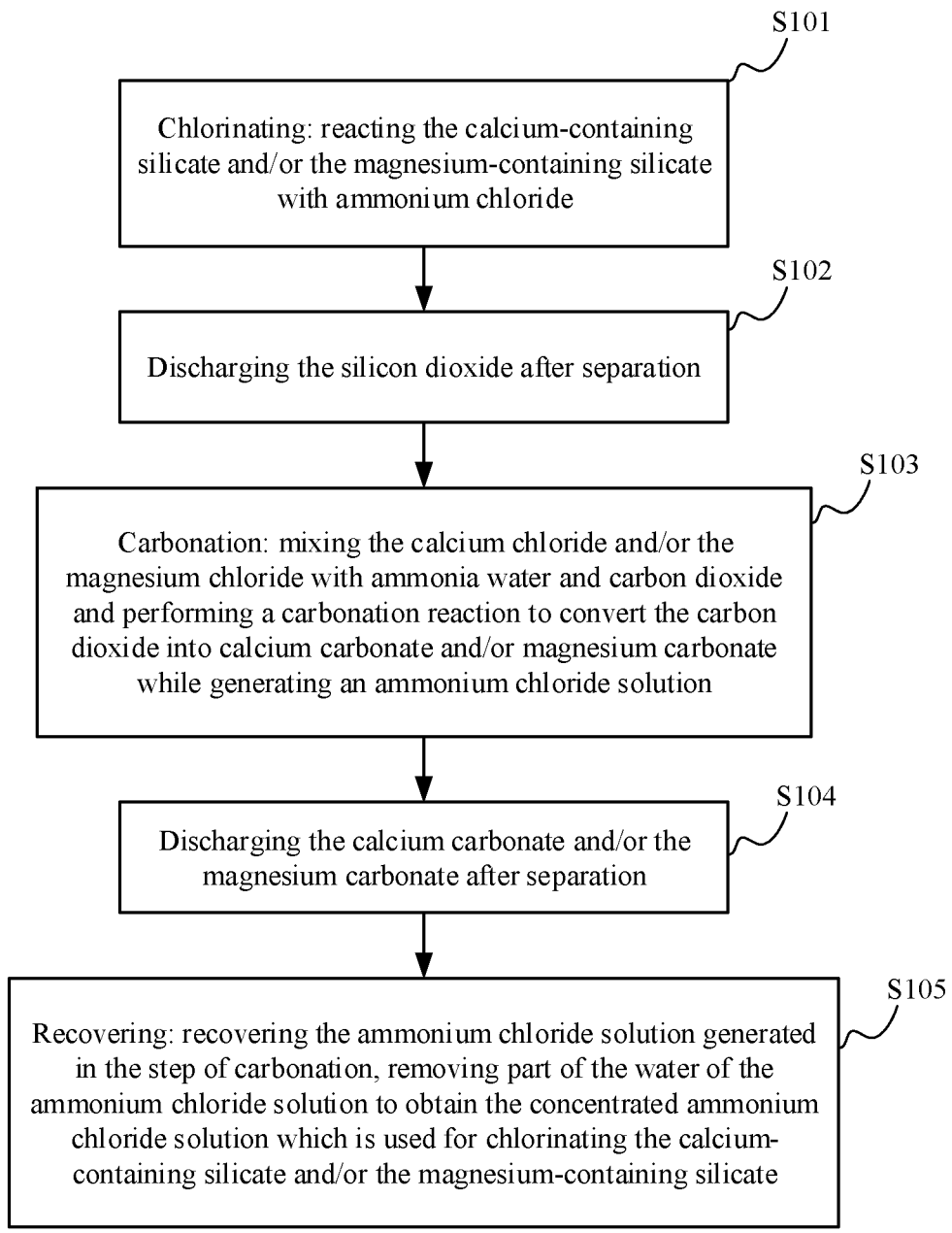
FIG. 1 shows a flow chart of a method for recycling carbon dioxide according to a first embodiment of the present disclosure.

The present invention will be described in more detail below with reference to the accompanying drawings. In the various figures, the same elements are denoted by the similar reference numerals. For the sake of clarity, the various parts in the figures are not drawn to scale. In addition, some well-known parts may not be shown in the figures.

In the following, many specific details of the disclosure are described, such as the structure, materials, dimensions, processing, and techniques of the components, in order to better understand the disclosure. As will be understood by those skilled in the art, the disclosure may be practiced without these specific details.

The present disclosure provides a method and a system for recycling carbon dioxide ($CO_2$), in which the carbon dioxide is absorbed with calcium silicate and/or magnesium silicate that has a large reserve and is cheap to finally generate carbonates such as calcium carbonate ($CaCO_3$) and magnesium carbonate ($MgCO_3$) in a solid state. Calcium carbonate or magnesium carbonate is widely used in the industry and may well realize the recycling of carbon dioxide.

The calcium-containing silicate and/or magnesium-containing silicate may be any silicate containing calcium ions and/or magnesium ions, such as calcium silicate ($CaSiO_3$), magnesium silicate ($MgSiO_3$), and a mixture of the two in any ratio, which may be derived from silicate ores, industrial wastes containing calcium silicate/magnesium silicate, waste concrete and building materials in the construction industry, etc. In the present disclosure, taking calcium silicate and/or magnesium silicate as an example, the principles of methods and systems for recycling carbon dioxide using other calcium-containing silicates and/or magnesium-containing silicates are similar.

Carbon dioxide may include various gases based on carbon dioxide and air, such as flue gas, wherein the volume content of carbon dioxide is 0.05% to 99.95%.

FIG. 1 shows a flow chart of a method for recycling carbon dioxide according to a first embodiment of the present disclosure, including steps S101 to step S105.

In the step S101, chlorinating is performed, i.e., chlorinating a calcium-containing silicate and/or a magnesium-containing silicate to obtain calcium chloride ($CaCl_2$) and/or magnesium chloride ($MgCl_2$). In the present embodiment, the step of chlorinating includes reacting the calcium-containing silicate and/or the magnesium-containing silicate with ammonium chloride, and in this step, in addition to calcium chloride, silicon dioxide ($SiO_2$) and ammonia gas ($NH_3$) are also generated. The specific reaction process is shown in the following formula (taking calcium silicate and/or magnesium silicate as an example):

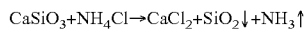

$$CaSiO_3 + NH_4Cl \rightarrow CaCl_2 + SiO_2\downarrow + NH_3\uparrow$$

The calcium silicate may be particles, the ammonium chloride may be either solid powders or a solution with a concentration of 1% to a saturated concentration, and the reaction temperature may be between 80° C. and 600° C.

In the step S102, a first separation is performed, i.e., discharging the carbon dioxide generated in the step S101 after separation. Specifically, a suspension composed of the calcium chloride solution and the silicon dioxide particles obtained after the reaction in the step S101 may be introduced into a first separator with an internal temperature controlled from 25° C. to 400° C., and then the silicon dioxide particles are discharged after sedimentation at the bottom of the separator for further drying to generate fine powder particles of the silica, which is a first final product.

In the step S103, carbonation is performed, i.e., mixing the calcium chloride and/or the magnesium chloride obtained from above steps with ammonia water (main component is $NH_4OH$) and carbon dioxide and performing a carbonation reaction to convert the carbon dioxide into calcium carbonate and/or magnesium carbonate while generating an ammonium chloride solution. The specific reaction process is shown in the following formula (taking calcium silicate and/or magnesium silicate as an example):

$$CaCl_2 + 2NH_3 + CO_2 + H_2O \rightarrow CaCO_3\downarrow + 2NH_4Cl$$

The temperature in the carbonation reactor may be controlled between 20° C. and 95° C. In the present embodiment, the ammonia gas generated in the step of chlorinating in the step S101 may be used to form the ammonia water in this step.

In the step S104, a second separation is performed, i.e., discharging the calcium carbonate and/or the magnesium carbonate generated in the step S103 after separation. Specifically, for example, the calcium carbonate and/or magnesium carbonate are discharged after sedimentation at the bottom of the carbonation reactor for further concentration and drying to generate a product of fine powders of calcium carbonate and/or magnesium carbonate, which is a second final product, so as to realize a stable fixation and recycling for carbon dioxide.

In the step S105, recovering of the ammonium chloride solution is performed, i.e., recovering the ammonium chloride solution generated in the step S104, for directly chlorinating the calcium-containing silicate and/or the magnesium-containing silicate by using hydrogen chloride generated in a decomposition reaction of the recovered ammonium chloride solution, or by using a concentrated solution of the recovered ammonium chloride solution. In the present embodiment, the recovered ammonium chloride solution is used in the step S101 after removing part of the water of the recovered ammonium chloride solution. Among them, the removing part of the water includes evaporating the ammonium chloride solution generated in the step of carbonation to obtain water vapor and the concentrated ammonium chloride solution, wherein the concentrated ammonium chloride solution is used for chlorinating.

Further, in the present embodiment, the water vapor obtained in the step of evaporating is subjected to heat recovery by a heat exchanger.

According to the method for recycling carbon dioxide of the present embodiment, the following reaction occurs during the step of chlorinating:

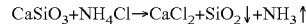

$$CaSiO_3 + NH_4Cl \rightarrow CaCl_2 + SiO_2\downarrow + NH_3\uparrow$$

the following reaction occurs during the step of carbonization:

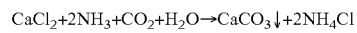

$$CaCl_2 + 2NH_3 + CO_2 + H_2O \rightarrow CaCO_3\downarrow + 2NH_4Cl$$

the overall reaction of the whole process is as follows:

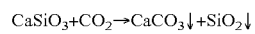

$$CaSiO_3 + CO_2 \rightarrow CaCO_3\downarrow + SiO_2\downarrow$$

The ammonium chloride is used as a catalyst for the mineralization of the entire carbon dioxide, so that the recycling of the ammonium chloride is realized without continuous addition, and the entire process reduces the material consumption as compared with the prior art. In the disclosure, recycling of the catalyst of ammonium chloride may be achieved under low and medium temperature conditions, which does not require the catalyst to be heated to a high temperature for recovery, and hence significantly reduces the energy consumption of the process, as compared with the prior art such as a technical solution in which magnesium chloride is used as a catalyst.

Further, the ammonia gas generated in the step of chlorinating in the present embodiment may be used to form the ammonia water in the carbonation step, so as to achieve maximum utilization of resources. In the present embodiment, during the process of recycling carbon dioxide, the reaction efficiency is high, the energy consumption and the material cost are low, thereby realizing better technical economy.

Figure 2:
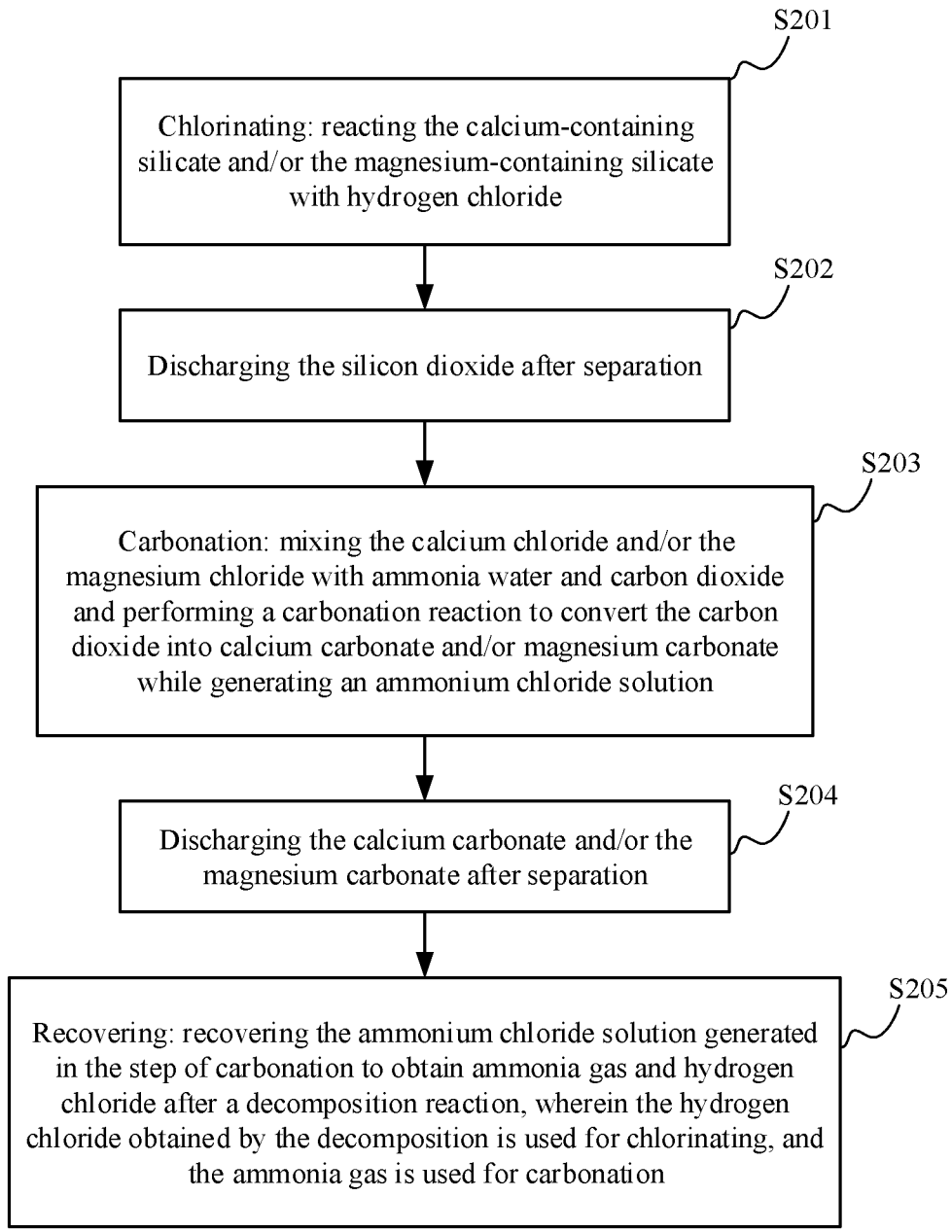
FIG. 2 shows a flow chart of a method for recycling carbon dioxide according to a second embodiment of the present disclosure.

FIG. 2 shows a flow chart of a method for recycling carbon dioxide according to a second embodiment of the present disclosure, including steps S201 to step S205.

In the step S201, chlorinating is performed, i.e., chlorinating a calcium-containing silicate and/or a magnesium-containing silicate to obtain calcium chloride and/or magnesium chloride. In the present embodiment, the step of chlorinating includes reacting the calcium-containing silicate and/or the magnesium-containing silicate with hydrogen chloride (HCl), and in this step, in addition to calcium chloride, silicon dioxide is also generated. The specific reaction process is shown in the following formula (taking calcium silicate and/or magnesium silicate as an example):

$$CaSiO_3+2HCl \rightarrow CaCl_2+SiO_2\downarrow+H_2O$$

The calcium silicate may be particles, the hydrogen chloride may be either vapor or a solution with a concentration of 1% to a saturated concentration (hydrochloric acid), and the reaction temperature may be between 80° C. and 400° C.

In the step S202, a first separation is performed, i.e., discharging the silicon dioxide generated in the step S201 after separation. Specifically, the suspension composed of the calcium chloride solution and the silicon dioxide particles obtained after the reaction in the step S201 may be introduced into the first separator, and then the silicon dioxide particles are discharged after sedimentation at the bottom of the separator for further drying to generate fine powder particles of the silica, which is a first final product.

In the step S203, carbonation is performed, i.e., mixing the calcium chloride and/or the magnesium chloride obtained from above steps with ammonia water and carbon dioxide and performing a carbonation reaction to convert the carbon dioxide into calcium carbonate and/or magnesium carbonate while generating an ammonium chloride solution. The specific reaction process is shown in the following formula (taking calcium silicate and/or magnesium silicate as an example):

$$CaCl_2+2NH_3+CO_2+H_2O \rightarrow CaCO_3\downarrow+2NH_4Cl$$

The temperature in the carbonation reactor may be controlled between 20° C. and 95° C., and a suspension composed of the ammonia chloride solution and the calcium carbonate solid is obtained after reaction.

In the step S204, a second separation is performed, i.e., discharging the calcium carbonate and/or the magnesium carbonate generated in the step S203 after separation. Specifically, for example, the above suspension composed of the ammonia chloride solution and the calcium carbonate and/or the magnesium carbonate solids is fed to a second separator, which separates the calcium carbonate and/or the magnesium carbonate solids from the ammonia chloride solution, wherein the calcium carbonate and/or the magnesium carbonate is subjected to further concentration and drying to generate a product of fine powders of calcium carbonate and/or magnesium carbonate, which is a second final product, so as to realize a stable fixation and recycling for carbon dioxide.

In the step S205, recovering of the ammonium chloride solution is performed, i.e., recovering the ammonium chloride solution generated in the step S204 for directly chlorinating the calcium-containing silicate and/or the magnesium-containing silicate after either a decomposition reaction to generate hydrogen chloride or after concentration. In the present embodiment, the ammonium chloride solution obtained from the separation by the second separator is concentrated to be fed into an ammonia gas regeneration reactor for obtaining the ammonia gas and the hydrogen chloride after the decomposition reaction, wherein the hydrogen chloride obtained by decomposition is used for the chlorinating in the step S201.

Further, in the present embodiment, the ammonia gas obtained by the decomposition is also used to form the ammonia water in the step S203.

According to the method for recycling carbon dioxide of the present embodiment, the following reaction occurs during the step of chlorinating:

$$CaSiO_3+2HCl \rightarrow CaCl_2+SiO_2\downarrow+H_2O$$

the following reaction occurs during the step of carbonization:

$$CaCl_2+2NH_3+CO_2+H_2O \rightarrow CaCO_3\downarrow+2NH_4Cl$$

the reaction in the ammonia gas regeneration reactor is as follows:

$$NH_4Cl \rightarrow NH_3\uparrow+HCl\uparrow$$

the overall reaction of the whole process is as follows:

$$CaSiO_3+CO_2 \rightarrow CaCO_3\downarrow+SiO_2\downarrow$$

The ammonium chloride is used as a catalyst for the mineralization of the entire carbon dioxide, so that the recycling of the ammonium chloride is realized without continuous addition, and the entire process reduces the material consumption as compared with the prior art. In the disclosure, recycling of the catalyst of ammonium chloride may be achieved under low and medium temperature conditions, and even under room temperature conditions, which does not require the catalyst to be heated to a high temperature for recovery, and hence significantly reduces the energy consumption of the process, as compared with the prior art such as a technical solution in which magnesium chloride is used as a catalyst.

Moreover, the ammonia gas obtained by the decomposition in the step of recovering in the present embodiment may be used to form the ammonia water in the carbonation step, so as to achieve maximum utilization of resources. In the present embodiment, during the process of recycling carbon dioxide, the reaction efficiency is high, the energy consumption and the material cost are low, thereby realizing better technical economy.

Figure 3:
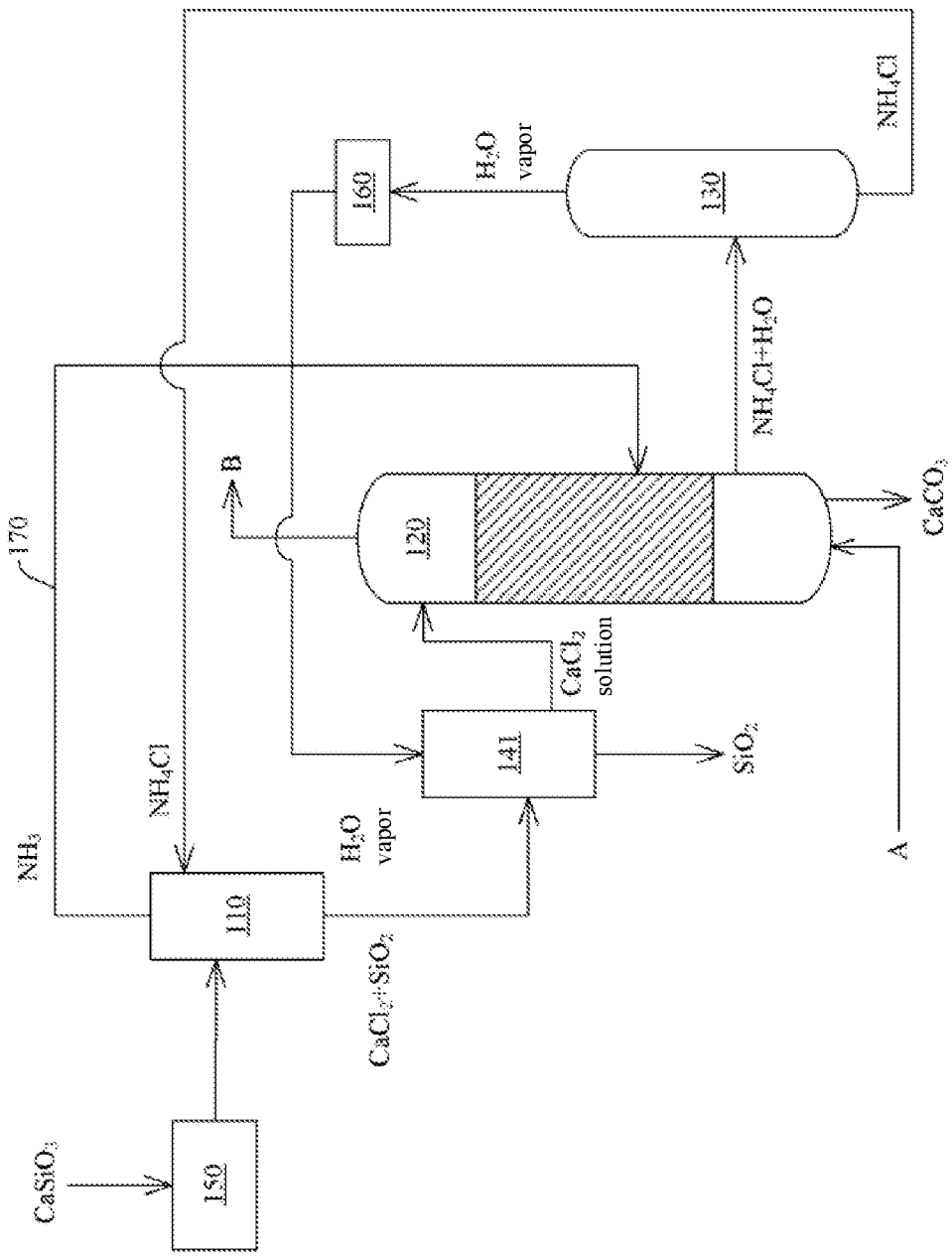
FIG. 3 shows a structural diagram of a system for recycling carbon dioxide according to the first embodiment of the present disclosure.

The present disclosure further provides a system for recycling carbon dioxide. FIG. 3 shows a structural diagram of a system for recycling carbon dioxide according to a first embodiment of the present disclosure. The system includes a chlorinating reactor 110, a carbonation reactor 120 and a recovering device 130. The chlorinating reactor 110 is configured to chlorinate a calcium-containing silicate and/or a magnesium-containing silicate to obtain calcium chloride and/or magnesium chloride. The carbonation reactor 120, connected to the chlorinating reactor 110, is configured to mix the calcium chloride and/or magnesium chloride with ammonia water and carbon dioxide and perform a carbonation reaction to fix the carbon dioxide into calcium carbonate and/or a magnesium carbonate while generating an ammonium chloride solution. The recovering device 130, connected between the carbonation reactor 120 and the chlorinating reactor 110, is configured to recover the ammonium chloride solution generated by the carbonation reactor 120 for directly feeding it into the chlorinating reactor 110 after a decomposition reaction to generate hydrogen chloride or after concentration.

In the present embodiment, the system further includes a pulverizing device 150, which is connected to the chlorinating reactor 110 and configured to pulverize the above calcium-containing silicate and/or magnesium-containing silicate and then feed into the chlorinating reactor 110, so as to enhance the reaction efficiency.

There are various ways to chlorinate the calcium-containing silicate and/or the magnesium-containing silicate in the chlorinating reactor 110. In the present embodiment, in the chlorinating reactor 110, the calcium-containing silicate and/or the magnesium-containing silicate are reacted with the ammonium chloride, and in addition to the calcium chloride, the silicon dioxide and the ammonia gas are also generated in the chlorinating reactor 110. The specific reaction process is shown in the following formula (taking calcium silicate and/or magnesium silicate as an example):

$$CaSiO_3 + NH_4Cl \rightarrow CaCl_2 + SiO_2\downarrow + NH_3\uparrow$$

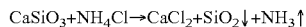

In the chlorinating reactor 110, the calcium silicate may be particles, the ammonium chloride may be either solid powders or a solution with a concentration of 1% to a saturated concentration, and the reaction temperature in the chlorinating reactor 110 may be between 80° C. and 600° C. The chlorinating reactor 110 may be a stirred vessel, a rotary furnace or other types of solid-solid or liquid-solid reactors. The suspension composed of the calcium chloride solution and the silicon dioxide particles may be discharged from the bottom of the chlorinating reactor 110, and the ammonia gas may be discharged from the top of the chlorinating reactor 110.

The system may further include a first separator 141, which is connected between the chlorinating reactor 110 and the carbonization reactor 120, and configured to discharge the silicon dioxide generated by the chlorinating reactor 110 after separation.

The first separator 141 may be a gas-liquid-solid three-phase separation device, and the temperature may be controlled at 50° C. to 400° C. The suspension composed of the calcium chloride solution and the silicon dioxide particles that is discharged from the bottom of the chlorinating reactor 110 is introduced into the first separator 141, and then the silicon dioxide particles are discharged after sedimentation at the bottom of the first separator 141 for further drying to generate fine powder particles of the silica, which is a first final product.

The silicon dioxide product may have a particle size distribution of 100 nm to 1 mm and a purity of 80% or more.

In the carbonation reactor 120, the calcium chloride and/or the magnesium chloride are mixed with ammonia water and carbon dioxide, and a carbonation reaction is performed, to recover and convert the carbon dioxide into calcium carbonate and/or a magnesium carbonate while generating an ammonium chloride solution. Gas A may be pure carbon dioxide, or any gas containing carbon dioxide. The specific reaction process from the bottom to the carbonation reactor 120 is shown in the following formula (taking calcium silicate and/or magnesium silicate as an example):

$$CaCl_2 + 2NH_3 + CO_2 + H_2O \rightarrow CaCO_3\downarrow + 2NH_4Cl$$

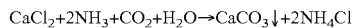

The carbonation reactor 120 may be a gas-liquid-solid three-phase reaction and separation device with an internal temperature between 20° C. and 95° C., and the mineralized absorption reaction process in the carbonation reactor 120 may be operated under normal pressure or under pressure. The carbonation reactor 120 may be, for example, a bubble column, an airlift loop reactor, a stirred vessel or gas-liquid reactors of other structures. The calcium chloride solution output from the first separator 141 may be added from the middle and upper part of the carbonation reactor 120. The gas A may be either pure carbon dioxide or any gases containing carbon dioxide, which is continuously added from the bottom to the bottom of the carbonation reactor 120. After reaction, the obtained purified air B may be discharged from the top of the carbonation reactor 120.

In the present embodiment, an ammonia gas pipeline 170 is further provided between the chlorinating reactor 110 and the carbonation reactor 120 to feed the ammonia gas generated by the chlorinating reactor 110 to the carbonation reactor 120. The ammonia gas pipeline 170 may be connected to the middle or upper part of the carbonation reactor 120. The ammonia gas is dissolved in water to obtain the ammonia water.

The calcium carbonate and/or magnesium carbonate may be discharged after sedimentation at the bottom of the carbonation reactor for further concentration and drying to generate a product of fine powders of calcium carbonate and/or magnesium carbonate, which is a second final product, so as to realize a stable fixation and recycling for carbon dioxide.

The product of calcium carbonate and/or magnesium carbonate may have a particle size distribution of 100 nm to 1 mm and a purity of 80% or more.

In the present embodiment, the recovering device 130 is an evaporative concentrator, which is an evaporative phase-change device; the evaporative concentrator has a temperature that may be controlled between 75° C. and 95° C., and a pressure that may be controlled between 350 mbar and 850 mbar; the evaporative concentrator separates the recovered ammonium chloride solution into water vapor and a concentrated ammonium chloride solution, wherein the concentrated ammonium chloride solution is fed to the chlorinating reactor 110 and recycled for use in the chlorinating operation In the present embodiment, the evaporative concentrator is further connected to a heat exchanger 160, wherein after the heat of the water vapor generated by the evaporative concentrator is recovered, the condensed water may be collected into the first separator 141 or fed to the carbonation reactor after being directly mixed with the calcium chloride solution flowing from the first separator.

According to the system for recycling carbon dioxide of the present embodiment, the following reaction occurs in the chlorinating reactor 110:

$$CaSiO_3 + NH_4Cl \rightarrow CaCl_2 + SiO_2\downarrow + NH_3\uparrow$$

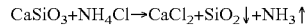

the following reaction occurs in the carbonization reactor 120:

$$CaCl_2 + 2NH_3 + CO_2 + H_2O \rightarrow CaCO_3\downarrow + 2NH_4Cl$$

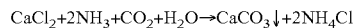

the overall reaction of the whole process is as follows:

$$CaSiO_3 + CO_2 \rightarrow CaCO_3\downarrow + SiO_2\downarrow$$

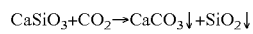

The ammonium chloride is used as a catalyst for the mineralization of the entire carbon dioxide, so that the recycling of the ammonium chloride is realized without continuous addition, and the entire process reduces the material consumption as compared with the prior art. In the disclosure, recycling of the catalyst of ammonium chloride may be achieved under low and medium temperature conditions, which does not require the catalyst to be heated to a high temperature for recovery, and hence significantly reduces the energy consumption of the process, as compared with the prior art such as a technical solution in which magnesium chloride is used as a catalyst.

In the present embodiment, the ammonia gas generated in the chlorinating reactor may be used to form the ammonia water in the carbonation operation, so as to achieve maximum utilization of resources. In the present embodiment, during the process of recycling carbon dioxide, the reaction efficiency is high, the energy consumption and the material cost are low, thereby realizing better technical economy.

Figure 4:
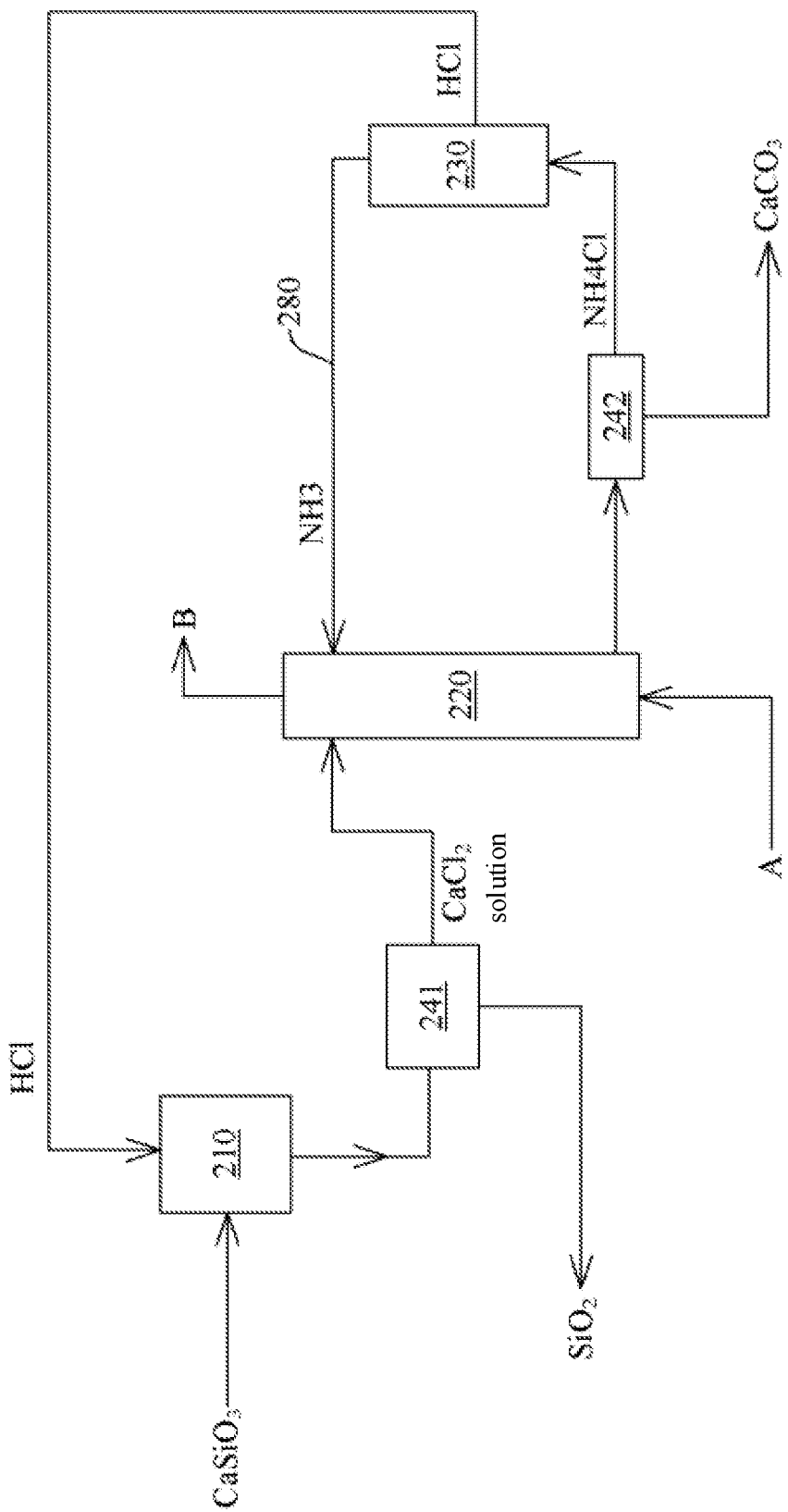
FIG. 4 shows a structural diagram of a system for recycling carbon dioxide according to the second embodiment of the present disclosure.

FIG. 4 shows a structural diagram of a system for recycling carbon dioxide according to a second embodiment of the present disclosure. The system includes a chlorinating reactor 210, a carbonation reactor 220 and a recovering device 230. The chlorinating reactor 210 is configured to chlorinate a calcium-containing silicate and/or a magnesium-containing silicate to obtain calcium chloride and/or magnesium chloride. The carbonation reactor 220, connected to the chlorinating reactor 210, is configured to mix the calcium chloride and/or magnesium chloride with ammonia water and carbon dioxide and perform a carbonation reaction to recover and convert the carbon dioxide into calcium carbonate and/or a magnesium carbonate while generating an ammonium chloride solution. The recovering device 230, connected between the carbonation reactor 220 and the chlorinating reactor 210, is configured to recover the ammonium chloride solution generated by the carbonation reactor 220 for directly feeding it into the chlorinating reactor 210 after a decomposition reaction to generate hydrogen chloride or after concentration.

There are various ways to chlorinate the calcium-containing silicate and/or the magnesium-containing silicate in the chlorinating reactor 210. In the present embodiment, in the chlorinating reactor 210, the calcium-containing silicate and/or the magnesium-containing silicate are reacted with the hydrogen chloride, and in addition to the calcium chloride, the silicon dioxide is also generated in the chlorinating reactor 210. The specific reaction process is shown in the following formula (taking calcium silicate and/or magnesium silicate as an example):

$$CaSiO_3 + 2HCl \rightarrow CaCl_2 + SiO_2\downarrow + H_2O$$

In the chlorinating reactor 210, the calcium silicate may be particles, the hydrogen chloride may be either vapor or a solution with a concentration of 1% to a saturated concentration (hydrochloric acid), and the reaction temperature may be between 80° C. and 400° C. The chlorinating reactor 210 may be a stirred vessel, a rotary furnace or other types of solid-solid or liquid-solid reactors. The suspension composed of the calcium chloride solution and the silicon dioxide particles may be discharged from the bottom of the chlorinating reactor 210, and the ammonia gas may be discharged from the top of the chlorinating reactor 210.

The system may further include a first separator 241, which is connected between the chlorinating reactor 210 and the carbonization reactor 220, and configured to discharge the silicon dioxide generated by the chlorinating reactor 210 after separation. The first separator 241 may be a gas-liquid-solid three-phase separation device; the silicon dioxide particles are discharged after sedimentation at the bottom of the first separator 241, and are subjected to further drying to generate fine powder particles of the silica, which is a first final product.

The silicon dioxide product may have a particle size distribution of 100 nm to 1 mm and a purity of 80% or more.

In the carbonation reactor 220, the calcium chloride and/or the magnesium chloride are mixed with ammonia water and carbon dioxide, and a carbonation reaction is performed, to recover and convert the carbon dioxide into calcium carbonate and/or a magnesium carbonate while generating an ammonium chloride solution. The specific reaction process is shown in the following formula (taking calcium silicate and/or magnesium silicate as an example):

$$CaCl_2 + 2NH_3 + CO_2 + H_2O \rightarrow CaCO_3\downarrow + 2NH_4Cl$$

The carbonation reactor 220 may be a gas-liquid-solid three-phase reaction and separation device with an internal temperature between 20° C. and 95° C., and the mineralized absorption reaction process in the carbonation reactor 220 may be operated under normal pressure or under pressure. The carbonation reactor 220 may be, for example, a bubble column, an airlift loop reactor, a fluidized bed or gas-liquid reactors of other structures. The calcium chloride solution output from the first separator 241 may be added from the middle and upper part of the carbonation reactor 220. The gas A may be either pure carbon dioxide or any gases containing carbon dioxide, which is continuously added from the bottom to the bottom of the carbonation reactor 220. The ammonia gas or the ammonia water may be added from the middle or upper part of the carbonation reactor 220. After reaction, the obtained purified air B may be discharged from the top of the carbonation reactor 220.

The system further may further include a first separator 242, which is connected between the carbonation reactor 220 and the recovering device 230, and configured to discharge the calcium carbonate and/or the magnesium carbonate after separation. The suspension composed of the ammonia chloride solution and the calcium carbonate and/or the magnesium carbonate solids that is discharged from the bottom of the carbonation reactor 220 is fed to the second separator 242, and the second separator 242 separates the calcium carbonate and/or the magnesium carbonate solids from the ammonia chloride solution, wherein the calcium carbonate and/or the magnesium carbonate is subjected to further concentration and drying to generate a product of fine powders of calcium carbonate and/or magnesium carbonate, which is a second final product, so as to realize a stable fixation and recycling for carbon dioxide.

The product of calcium carbonate and/or magnesium carbonate may have a particle size distribution of 100 nm to 1 mm and a purity of 80% or more.

In the present embodiment, for example, the recovering device 230 is ammonia gas regeneration reactor that decomposes the recovered ammonium chloride solution into ammonia gas and hydrogen chloride, wherein the hydrogen chloride obtained by the decomposition is fed to the chlorinating reactor 210 for recycling and chlorinating. Preferably, the concentration operation may be performed before the recovered ammonium chloride solution is fed into the recovering device 230.

In the present embodiment, the ammonia gas regeneration reactor is further connected to the carbonation reactor 220 through a gas pipeline 280 for feeding the ammonia gas obtained by the decomposition to the carbonation reactor 220, and then the ammonia gas is dissolved in water to form the ammonia water.

According to the system for recycling carbon dioxide of the present embodiment, the following reaction occurs in the chlorinating reactor 110:

$$CaSiO_3 + 2HCl \rightarrow CaCl_2 + SiO_2\downarrow + H_2O$$

the following reaction occurs in the carbonization reactor 120:

$$CaCl_2+2NH_3+CO_2+H_2O \rightarrow CaCO_3\downarrow+2NH_4Cl$$

the reaction in the ammonia gas regeneration reactor is as follows:

$$NH_4Cl \rightarrow NH_3\uparrow+HCl\uparrow$$

the overall reaction of the whole process is as follows:

$$CaSiO_3+CO_2 \rightarrow CaCO_3\downarrow+SiO_2\downarrow$$

The ammonium chloride is used as a catalyst for the mineralization of the entire carbon dioxide, so that the recycling of the ammonium chloride is realized without continuous addition, and the entire process reduces the material consumption as compared with the prior art. In the disclosure, recycling of the catalyst of ammonium chloride may be achieved under low and medium temperature conditions, which does not require the catalyst to be heated to a high temperature for recovery, and hence significantly reduces the energy consumption of the process, as compared with the prior art such as a technical solution in which magnesium chloride is used as a catalyst.

Moreover, in the present embodiment, the ammonia gas regeneration reactor is further connected to the carbonation reactor 220 through the gas pipeline 280 for feeding the ammonia gas obtained by the decomposition to the carbonation reactor 220 for forming the ammonia water in the carbonation operation, so as to achieve the maximum utilization of resources. In the present embodiment, during the process of recycling carbon dioxide, the reaction efficiency is high, the energy consumption and the material cost are low, thereby realizing better technical economy.

It is to be explained that the relationship terms, such as "first" and "second", are used herein only for distinguishing one entity or operation from another entity or operation but do not necessarily require or imply that there exists any actual relationship or sequence of this sort between these entities or operations. Furthermore, terms "comprising", "including" or any other variants are intended to cover the non-exclusive including, thereby making that the process, method, merchandise or device comprising a series of elements comprise not only those elements but also other elements that are not listed explicitly or the inherent elements to the process, method, merchandise or device. In the case of no more limitations, the element limited by the sentence "comprising a . . . " does not exclude that there exists another same element in the process, method, merchandise or device comprising the element.

The embodiments in accordance with the present invention, as described above, are not described in detail, and are not intended to limit the present invention to be only the described particular embodiments. Obviously, many modifications and variations are possible in light of the above. These embodiments have been chosen and described in detail by the specification to explain the principles and embodiments of the present invention so that those skilled in the art can make good use of the present invention and the modified use based on the present invention. The invention is to be limited only by the scope of the appended claims and the appended claims and equivalents thereof.

What is claimed is:

1. A system for recycling carbon dioxide, comprising:
    a chlorinating reactor, configured to chlorinate a calcium-containing silicate and/or a magnesium-containing silicate to obtain calcium chloride and/or magnesium chloride;
    a carbonation reactor, connected to the chlorinating reactor, configured to mix the calcium chloride and/or magnesium chloride with ammonia water and carbon dioxide and perform a carbonation reaction to convert the carbon dioxide into calcium carbonate and/or a magnesium carbonate while generating an ammonium chloride solution; and
    a recovering device, connected between the carbonation reactor and the chlorinating reactor, configured to recover the ammonium chloride solution generated by the carbonation reactor, wherein the ammonium chloride solution after being concentrated or hydrogen chloride generated from a decomposition reaction of the ammonium chloride solution is directly fed from the recovering device into the chlorinating reactor,
    wherein the recovering device is a single gas-liquid two phase reaction device without solid discharging structure, and is connected to a separator which is for discharging solid,
    wherein the carbonation reactor is a single gas-liquid-solid three-phase reaction device for mixing ammonia gas, the calcium chloride and/or magnesium chloride, and gas containing the carbon dioxide together after the ammonia gas, the calcium chloride and/or magnesium chloride, and the gas containing the carbon dioxide are fed into the single gas-liquid-solid three-phase reaction device,
    wherein the chlorinating reactor is any one of a stirred vessel and a rotary furnace, and the carbonation reactor is any of a bubble column, an airlift loop reactor, and a fluidized bed,
    wherein the recovering device is implemented by:
        an evaporative concentrator that separates the recovered ammonium chloride solution into water vapor and the concentrated ammonium chloride solution, wherein the concentrated ammonium chloride solution is fed to the chlorinating reactor, and the evaporative concentrator is further connected to the separator through a heat exchanger, through which the water vapor generated in the evaporative concentrator is sent back to the separator; or
        an ammonia gas regeneration reactor that configured to decompose the recovered ammonium chloride solution into ammonia gas and hydrogen chloride, wherein the hydrogen chloride obtained by decomposition is fed to the chlorinating reactor, and the ammonia gas regeneration reactor is further connected to the carbonation reactor through a gas pipeline for feeding the ammonia gas obtained by the decomposition to the carbonation reactor.

2. The system according to claim 1, wherein silicon dioxide is also generated in the chlorinating reactor, and
    the separator is connected between the chlorinating reactor and the carbonation reactor and configured to separate and then discharge the silicon dioxide.

3. The system according to claim 1, wherein the
    separator is connected between the carbonation reactor and the recovering device, and is configured to separate and discharge the calcium carbonate and/or the magnesium carbonate.

4. The system according to claim 2, wherein in the chlorinating reactor, the calcium-containing silicate and/or the magnesium-containing silicate are reacted with ammonium chloride, and ammonia gas is further generated in the chlorinating reactor.

5. The system according to claim 4, wherein the ammonia gas pipeline is further provided between the chlorinating reactor and the carbonation reactor and is configured to feed the ammonia gas generated by the chlorinating reactor to the carbonation reactor.

6. The system according to claim 1, wherein in the chlorinating reactor, the calcium-containing silicate and/or the magnesium-containing silicate are reacted with ammonium chloride.

7. The system according to claim 1, wherein the calcium carbonate and/or the magnesium carbonate are discharged after being separated by sedimentation in the carbonation reactor.

8. A method for recycling carbon dioxide using a system according to claim 1, wherein the method comprises:
   chlorinating a calcium-containing silicate and/or a magnesium-containing silicate to obtain calcium chloride and/or magnesium chloride;
   mixing the calcium chloride and/or the magnesium chloride with ammonia water and carbon dioxide and performing a carbonation reaction to convert the carbon dioxide into calcium carbonate and/or magnesium carbonate while generating an ammonium chloride solution; and
   recovering the ammonium chloride solution generated in the carbonation reaction,
   wherein the ammonium chloride solution after being concentrated or hydrogen chloride generated from a decomposition reaction of the ammonium chloride solution is directly used to chlorinate the calcium-containing silicate and/or the magnesium-containing silicate.

9. The method according to claim 8, wherein silicon dioxide is also generated in the step of chlorinating, and before the carbonation reaction, the method further comprises:
   separating out and discharging the silicon dioxide.

10. The method according to claim 8, wherein after the carbonation reaction, the method further comprises:
    separating out and discharging the calcium carbonate and/or the magnesium carbonate.

11. The method according to claim 8, wherein the step of chlorinating comprises: reacting the calcium-containing silicate and/or the magnesium-containing silicate with ammonium chloride, and the step of chlorinating further generate ammonia gas.

12. The method according to claim 11, wherein the ammonia gas generated in the step of chlorinating is used to form the ammonia water which is used in the carbonation reaction.

13. The method according to claim 8, wherein the step of recovering comprises: recovering the ammonium chloride solution generated in the carbonation reaction, and removing partial water of the recovered ammonium chloride solution to obtain the concentrated ammonium chloride solution which is used for chlorinating the calcium-containing silicate and/or the magnesium-containing silicate.

14. The method according to claim 13, wherein the step of removing partial water of the recovered ammonium chloride solution comprises: evaporating the ammonium chloride solution generated in the carbonation reaction to obtain water vapor and the concentrated ammonium chloride solution, wherein the concentrated ammonium chloride solution is used for chlorinating.

15. The method according to claim 14, wherein the water vapor obtained in the step of evaporating is subjected to heat recovery.

16. The method according to claim 8, wherein the step of chlorinating comprises: reacting the calcium-containing silicate and/or the magnesium-containing silicate with hydrogen chloride.

17. The method according to claim 16, wherein the step of recovering comprises: recovering the ammonium chloride solution generated in the carbonation reaction, performing a decomposition reaction of the recovered ammonium chloride solution to obtain ammonia gas and hydrogen chloride, wherein the hydrogen chloride obtained by the decomposition reaction is used for chlorinating.

18. The method according to claim 17, wherein the ammonia gas obtained by the decomposition reaction is used to form the ammonia water which is used in the carbonation reaction.

\* \* \* \* \*